United States Patent
Schauder

(10) Patent No.: US 11,023,499 B2
(45) Date of Patent: Jun. 1, 2021

(54) OBJECT RELATIONAL MAPPING FOR RELATIONAL DATABASES

(71) Applicant: Pivotal Software, Inc., San Francisco, CA (US)

(72) Inventor: Jens Schauder, Braunschweig (DE)

(73) Assignee: Pivotal Software, Inc., San Francisco, CA (US)

( * ) Notice: Subject to any disclaimer, the term of this patent is extended or adjusted under 35 U.S.C. 154(b) by 162 days.

(21) Appl. No.: 16/203,454

(22) Filed: Nov. 28, 2018

(65) Prior Publication Data

US 2020/0167374 A1    May 28, 2020

(51) Int. Cl.
*G06F 16/28* (2019.01)
*G06F 16/242* (2019.01)
*G06F 16/25* (2019.01)
*G06F 16/245* (2019.01)
*G06F 16/2455* (2019.01)

(52) U.S. Cl.
CPC ......... *G06F 16/288* (2019.01); *G06F 16/244* (2019.01); *G06F 16/245* (2019.01); *G06F 16/252* (2019.01); *G06F 16/24552* (2019.01)

(58) Field of Classification Search
CPC .... G06F 16/288; G06F 16/244; G06F 16/252; G06F 16/245
See application file for complete search history.

(56) References Cited

U.S. PATENT DOCUMENTS

| | | | | |
|---|---|---|---|---|
| 5,615,362 A | * | 3/1997 | Jensen | G06F 16/289 |
| 6,070,165 A | * | 5/2000 | Whitmore | G06F 16/284 |
| 2012/0072470 A1 | * | 3/2012 | Joseph | G06F 16/24552 |
| | | | | 707/812 |

OTHER PUBLICATIONS

Torres-Jimenez, Jose. "MAXCLIQUE Problem Solved Using SQL." In Proceedings of the third International Conference on Advances in Databases, Knowledge, and Data Applications—DBKDA. St. Maarten, The Netherlands Antilles, Jan., pp. 23-28. 2011. (Year: 2011).*
Github.com [online], "DATAJDBC-156—Describe available mappings in README," Nov. 29, 2017, [retrieved on Dec. 4, 2018], retrieved from URL <https://github.com/spring-projects/spring-data-jdbc/commit/ab6da6edff3f3247c8937f4534517c5e19a6f977>, 2 pages.
Jboss.org [online], "Hibernate ORM 5.3.7.Final User Guide," Oct. 16, 2018, [retrieved on Dec. 4, 2018], retrieved from URL <https://docs.jboss.org/hibernate/stable/orm/userguide/html_single/Hibernate_User_Guide.html>, 344 pages.

(Continued)

*Primary Examiner* — Jesse P Frumkin
(74) *Attorney, Agent, or Firm* — Fish & Richardson P.C.

(57) ABSTRACT

Methods, systems, and apparatus, including computer programs encoded on computer storage media, for enforcing a mapping between entities in a database and aggregates in an application framework. One of the methods includes receiving a request to populate a program object corresponding to an entity in a first relation of a relational database, the relational database is queried to obtain values for one or more attributes of the entity in the first relation and a plurality of identifiers that each identify a respective entity in the second relation of the relational database. The program object is populated with an aggregate having a complete collection of identifiers representing an m-to-n relationship in the database.

21 Claims, 3 Drawing Sheets

(56) References Cited

OTHER PUBLICATIONS

Oracle.com [online], "Package javax.persistence," available on or before Jul. 15, 2017 via Internet Archive: Wayback Machine URL <https://web.archive.org/web/20171222055113/https://docs.oracle.com/javaee/7/api/javax/persistence/package-summary.html>, [retrieved on Dec. 4, 2018], retrieved from URL <https://docs.oracle.com/javaee/7/api/javax/persistence/package-summary.html>, 9 pages.

Scabl.blogspot.com [online], "Advancing Enterprise DDD—The Entity and the Aggregate Root," Mar. 29, 2015, [retrieved on Dec. 4, 2018], retrieved from URL <http://scabl.blogspot.com/2015/03/aeddd-5.html> 5 pages.

Docs.spring.io [online], "Spring Data JDBC—Reference Documentation," Nov. 27, 2018, [retrieved on Dec. 4, 2018], retrieved from URL <https://docs.spring.io/spring-data/jdbc/docs/1.0.3.RELEASE/reference/html/#new-features.1-0-0>, 74 pages.

\* cited by examiner

OBJECT RELATIONAL MAPPING FOR RELATIONAL DATABASES

BACKGROUND

This specification relates to object relational mapping of relational databases.

A relational database is a database storing tuples in one or more relations. In this specification, a database table is a relation having one or more tuples, with each tuple having one or more elements that each correspond to a respective attribute of the relation. The tuples belonging to a database table can be stored in any appropriate form, and a relation being referred to as a database table does not imply that its tuples are stored contiguously or in tabular form.

In this specification, the term "entity" will be used to refer to a portion of a tuple in a relation. Thus, for example, a book entity can refer to all or less than all of a tuple representing a book in a books table. For example, a book entity in a table can be updated with an author name and a publication date, and other tuple attributes can remain the same.

Relational databases can store tuples representing different kinds of relationships. For tables storing data representing one or more entities, and each entity identified by a respective primary key, a first entity in a first table is said to have a relationship with a second entity in a second table if the first entity stores the primary key of the second entity. From the perspective of the first entity, the first entity is said to store a foreign key for the second entity, e.g., a primary key foreign to the first table. From the perspective of the second entity, the first entity is said to store the primary key for the second entity. The second entity may additionally store the primary key of the first entity, depending on the type of relationship.

The type of relationship represented by the tuples stored in the relational database depends on what identifiers, e.g., keys, the tuples store. If the first entity stores a foreign key of only the second entity, then the first entity and the second entity have a 1-to-1 relationship. The foreign key of the second entity must be unique to the first entity, e.g., only the first entity stores the foreign key of the second entity. For example, if the first entity represents a book, and the second entity represents a serial number for the book, then the entities define a 1-to-1 relationship, because each book has only one serial number, and each serial number is associated with only one book.

If a plurality of entities each store the foreign key of the first entity, then from the perspective of the first entity, the first entity defines a 1-to-Many relationship with the plurality of entities. For example, a book entity representing a book is in a 1-to-Many relationship with a plurality of page entities representing pages of the book, because one book can have many pages, but each page is associated with only one book. If the first entity stores the foreign keys of the plurality of entities, then from the perspective of the plurality of entities, the entities define a Many-to-1 relationship with the first entity.

If the first entity stores foreign keys for a plurality of entities in the second table, including the second entity (e.g., M foreign keys), and the second entity stores foreign keys for a plurality of entities in the first table, including the first entity (e.g., N foreign keys), then the entities have an N-to-M relationship. The first entity can store foreign keys for a plurality of entities using one or more bridge tables, discussed below. For example, each book entity has a relationship with multiple author entities, e.g., because the book was written by multiple authors, and each author entity has a relationship with multiple book entities, e.g., because each author has authored multiple books. An N-to-M relationship is also referred to as a Many-to-Many relationship.

To support Many-to-Many relationships in a relational database, the relational database can maintain one or more bridge tables. A bridge table is a table that stores one or more associative entities. An associative entity stores, as its primary key, a plurality of foreign keys for entities across a plurality of tables. In an example of book entities in a book table and author entities in an author table defining a Many-to-Many relationship, the relational database can additionally include a book-author bridge table. The book-author bridge table stores relationships as associative entities between book entities and respective author entities.

SUMMARY

This specification describes technologies for a relational database object mapping system to implement mappings between program objects and entities having Many-to-Many relationships in a database by enforcing population of such relationships in a new construct that will be referred to as an aggregate. In this specification, an aggregate for a particular entity is a program structure that includes one or more related entities belonging to that aggregate and a collection of identifiers of other aggregates representing other entities related to the particular entity in the database. An entity belongs to exactly one aggregate. Generally, the aggregates exist only as program objects and do not exist in the database itself.

In the program, a relationship between entities of different aggregates is modeled by an aggregate having an identifier of another aggregate representing the related entity. Each aggregate representing an entity in the database has one special entity, which in this specification will be referred to as the aggregate root. The identifier of the aggregate root is the identifier for the aggregate. A reference from one aggregate to another aggregate in the program can only be a reference to an aggregate root of the other aggregate. In other words, the relational database object mapping system does not allow an aggregate of one entity to reference a non-root aggregate identifier of another entity.

An aggregate for a particular entity is considered a complete aggregate for the particular entity when the aggregate includes all of the attributes for all entities belonging to the aggregate, including the aggregate root, as well as all identifiers for all entities related to the aggregate root and belonging to other aggregate roots. The system can enforce the requirement that all aggregates generated be complete aggregates, e.g., by additionally querying the relational database for additional data associated with the particular entity and using the query results to generate a complete aggregate.

In general, one innovative aspect of the subject matter described in this specification can be embodied in methods that include the actions of maintaining, by an application framework, a mapping between entities represented in a relational database and respective corresponding objects in a program being executed by the application framework, wherein manipulations in the program on program objects representing entities in the relational database causes the application framework to perform corresponding updates to one or more tuples in the relational database, wherein the relational database includes one or more relations defining an m-to-n mapping relationship between entities in a first relation of the relational database and respective entities in a second relation of the relational database; receiving, by the application framework, a request to populate a program object corresponding to an entity in the first relation of the relational database, wherein the m-to-n mapping relationship defines one or more references to respective entities in the second relation of the relational database; querying, by the application framework, the relational database to obtain values for one or more attributes of the entity in the first relation and a plurality of identifiers that each identify a respective entity in the second relation of the relational database; and populating, by the application framework, the program object with an aggregate comprising the values for the one or more attributes and the plurality of identifiers. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. In particular, one embodiment includes all the following features in combination.

Receiving, by the application framework, an indication that the aggregate was updated by the program with information identifying a new entity in the second relation; and n response, updating the m-to-n mapping relationship of the relational database with an identifier of the new entity in the second relation in response to the aggregate being updated by the program.

Updating the m-to-n mapping relationship may comprise: deleting, from the m-to-n mapping relationship, all identifiers to which the entity in the first relation is mapped; and inserting, into the m-to-n mapping relationship, all identifiers identifying all entities in the second relation belonging to the aggregate.

Receiving, by the application framework, a request to save a new aggregate for an entity in the first relation comprising a plurality of identifiers for entities in the second relation; and in response, inserting, into the m-to-n mapping relationship, all identifiers for the entities in the second relation belonging to the new aggregate.

Receiving, by the application framework, a request through the program object to obtain an attribute of a particular entity in the second relation having an identifier among the plurality of identifiers for entities in the second relation of the aggregate; in response, querying, by the application framework, the relational database to obtain a value for the attribute of the particular entity; and generating, by the application framework, an aggregate for the particular entity comprising an aggregate id and a plurality of identifiers for entities in the first relation.

Optionally, the application framework is configured not to perform lazy loading of references to the identifiers for entities in the second relation.

Optionally, the application framework is configured to always load all identifiers for entities in the second relation when populating program objects corresponding to entities in the first relation.

Generating an aggregate may comprise generating the aggregate to have only attributes of the entity in the first relation or identifiers of aggregate roots of different aggregates.

Particular embodiments of the subject matter described in this specification can be implemented so as to realize one or more of the following advantages. The system can reduce complexity in client programs executed by the application framework by enforcing how the program relates objects to entities, at least because enforcing the complete aggregate design prevents Many-to-Many relationships between objects representing respective entities from different aggregates. In particular, the application framework can raise an exception if the program attempts to relate two objects representing respective entities from different aggregates. For example, the application framework could refuse to populate a book object with a direct reference to an author entity, by raising an exception and requiring the program populate the book object only with a list of foreign keys of corresponding author entities. Additionally, as a result of the exception handling, the system can enforce better design practice in the program, by minimizing errors associated with object relational mapping where Many-to-Many relationships are allowed. The application framework can generate a complete aggregate that completely captures the relationships of the respective entity with related entities, because the application framework can make the assumption that mapped relationships between objects and entities are not Many-to-Many relationships. Complete aggregates can be cached or pre-loaded into a cache to minimize roundtrips to the relational database. Strategies for caching and preloading can be independent of the mapping between program objects and relational tables, allowing flexible implementation of the subject matter. By pre-loading the cache with complete aggregates, the system can obviate the need for subsequent queries to the relational database when populating a program object with data from a corresponding entity The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
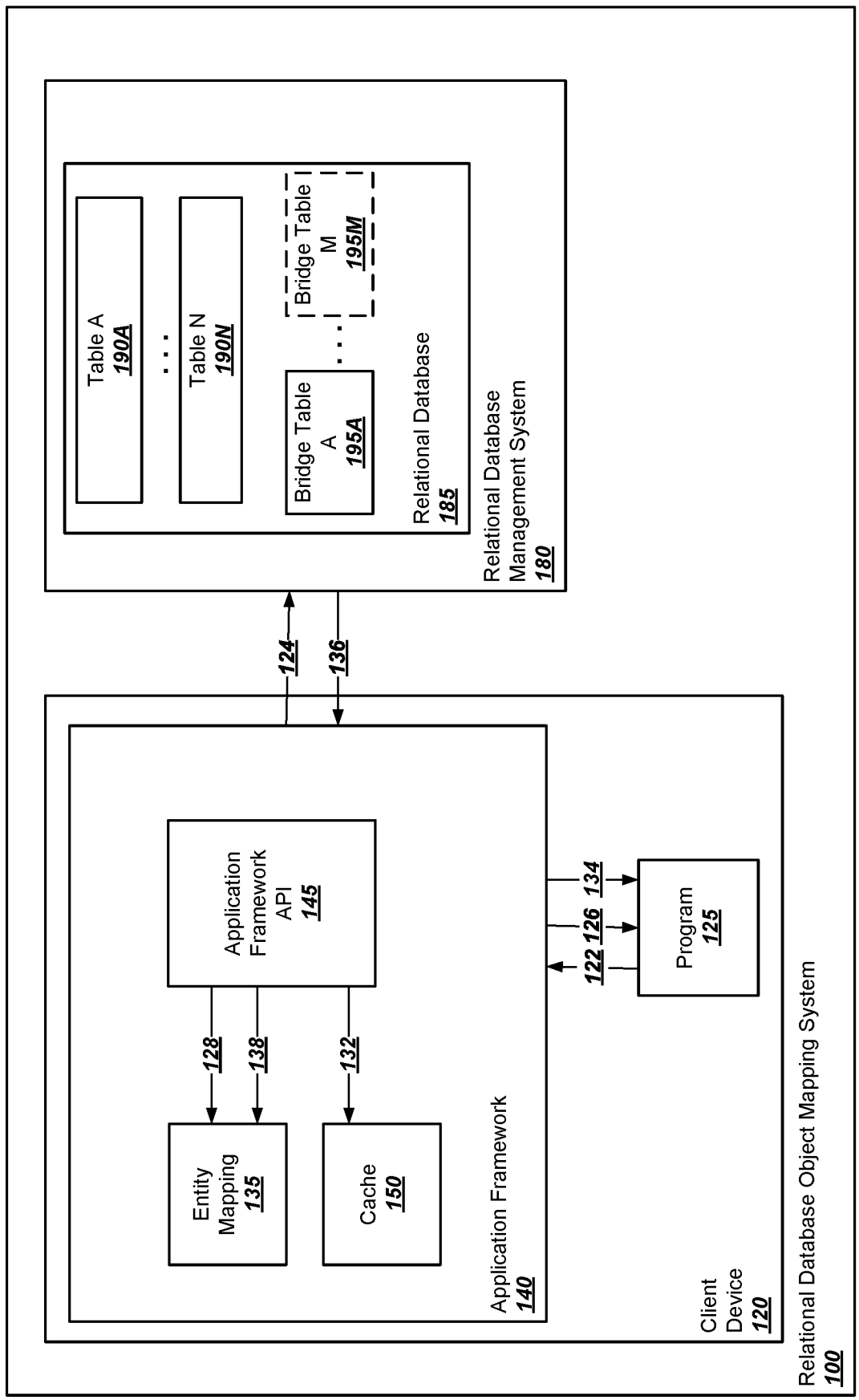
FIG. 1 is a diagram of a relational database object mapping system.

This specification describes how a relational database object mapping system maintains an entity mapping between program objects in a program and entities stored in a relational database, by populating a respective program object with an aggregate for the entity mapped to the program object. An aggregate for a particular entity is a program structure that includes one or more related entities belonging to the aggregate and a collection of identifiers, e.g., foreign keys, of other aggregates representing other entities related to the particular entity in the database. An entity belongs to exactly one aggregate. The particular entity for an aggregate is also called the aggregate root of the aggregate.

An aggregate is considered a complete aggregate when the aggregate includes all of the attributes for all entities related to the aggregate root for the aggregate, as well as a list of identifiers for all of the entities related to the particular entity. In other words, a complete aggregate is completely defined by the (i) attributes for all entities belonging to the aggregate and (ii) all of the identifiers for entities outside of the aggregate, related to the aggregate root.

The system can enforce the requirement that all aggregates generated by the system are complete aggregates. In particular, the system can enforce the requirement that if an entity references another entity, then the entities are either: (i) in the same aggregate, or (ii) two aggregate roots for two different aggregates. Unless otherwise noted, aggregates as discussed in this specification are considered complete aggregates. How the system generates aggregates and enforces the requirement that all aggregates be complete aggregates is discussed below.

Aggregates solve the problem of pre-loading entities queried from a relational database, where the relational database contains Many-to-Many relationships between entities. In particular, because an aggregate includes a list of identifiers, e.g., foreign keys, for the entities related to the aggregate root, the system can selectively pre-load one or more aggregates related to the aggregate root into local memory, to obviate the need for subsequent queries to the relational database. The system can store related aggregates in a local cache without repeated requests for queried data back and forth from the relational database, at least because aggregates enforce only 1-to-1 or 1-to-Many relationships between entities.

The system can enforce the requirement that all aggregates generated be complete aggregates. For example, and as discussed below, an application framework in the system can receive a request from a program, that when executed by the application framework, causes the application framework to populate a program object with data from a requested entity. Even if the request to populate the program object is for some, but not all data that is represented by the requested entity, the application framework can augment a query or perform additional queries to a relational database to include all of the attributes and all of the identifiers of the entities related to the requested entity. The application framework can then receive query results from the relational database and can use the query results to generate a complete aggregate for the requested entity. The application framework can use the complete aggregate to pre-load a cache.

The system can maintain the entity mapping between program objects and entities as the system can handle requests to modify data representing a respective program object, where the program object is populated by a corresponding entity in the relational database. In particular, the system maintains the entity mapping by receiving explicit requests to update the entity mapping from the program executed by the application framework. By limiting updates to the entity mapping to explicit requests to update only, the program executed by the application framework can better track updates to relationships between objects and entities, and reduce complexity compared to applications where the entity mapping for program objects in a program is maintained dynamically.

The system can facilitate the implicit or explicit pre-loading of entities, at least because aggregates populating program objects define the complete relationship between the aggregate root for the aggregate and related entities. As a result, the system can avoid having to make multiple queries to a bridge table in the relational database associating entries having Many-to-Many relationships.

FIG. 1 is a diagram of a relational database object mapping system 100. The system 100 is an example of a system implemented as computer programs on one or more computers in one or more locations, in which the systems, components, and techniques described below can be implemented.

The system 100 includes a client device 120, e.g., an application server, a mobile device, or a terminal. The client device 120 additionally stores a program 125 and has installed an application framework 140. The application framework 140 includes an application framework API (Application Program Interface) 145 for communicating with the application framework 140 and a cache 150.

The application framework 140 provides a runtime environment to execute a program, e.g., the program 125. In particular, the application framework 140 handles routines in the program 125 defined by the application framework API 145 for receiving queries, querying a relational database 185, receiving query results for the query, populating a program object in the program 125, and updating an entity mapping 135 between program objects and entities. A detailed discussion of the application framework 140 follows, below.

The relational database 185 organizes data by relation, tuple, and element. The relational database 185 stores tuples in one or more tables. In this specification, the term "entity" will be used to refer to a portion of a tuple in a relation. An entity can refer to all or less than all of a tuple in a table in the relational database 185. Each table in the plurality of tables 190A-N stores data for entities of a particular type. For example, the relational database 185 can have a Book table for storing Book entities, and an Author table for storing Author entities.

The relational database 185 is maintained by a relational database management system 180. The management system 180 receives queries from the application framework 140 for the relational database 185 and returns query results from the relational database 185. Although illustrated as a separate system in FIG. 1, the relational database management system 180 can also be installed on the client device 120 and can be part of the application framework 140.

The entities in the plurality of tables 190A-N define one or more N-to-M (also called "Many-to-Many") relationships between N respective entities in one table in the plurality of tables 190A-N with M respective entities in another table in the plurality of tables 190A-N. For example, the N-to-M relationship between the respective entities in the plurality of tables 190A-N can represent relationships between book entities in a book table storing multiple author entities, e.g., by storing the foreign keys of the author entities, and author entities in an author table storing multiple book entities, e.g., by storing the foreign keys of the book entities.

For each Many-to-Many relationship between the entities in the plurality of tables 190A-N, the relational database 185 can include a respective bridge table from one or more bridge tables 195A-M, containing a plurality of associative entities for the respective N-to-M relationship. For example, if the relational database 185 stores a Book table for book entities, and an Author table for author entities defining a Many-to-Many relationship, then the one or more bridge tables 195A-M includes a book-author table, storing relationships between book entities and respective author entities, e.g., by using associative entities.

The program 125 contains one or more statements that each call a routine defined by the application framework API 145 that when executed by the application framework 140, modifies one or more program objects. A program object can be any combination of functions, variables, and data structures representing data. Data used to populate a program object is associated with data in the relational database 185.

Additionally, the application framework API 145 can define one or more routines, that when executed, causes the application framework 140 to update an entity mapping 135, as discussed below.

The application framework 140 can maintain the cache 150 that stores data from the relational database 185. For example, if data for a particular entity has already been retrieved from the relational database 185 and stored in the cache 150, the application framework 140 can obtain the requested data from the cache 150 instead of querying the relational database 185. Discussion follows below explaining what data the application framework stores in the cache 150.

The application framework 140 can maintain the entity mapping 135 between entities represented in the relational database 185 with corresponding program objects in the program 125. The entity mapping 135 represents what program objects in the program 125 are mapped to what corresponding entities in the relational database 185.

To update the entity mapping, the application framework 140 can receive an explicit request from the program 125, e.g., by a statement in the program 125, that when executed by the application framework 140, causes the application framework 140 to update the entity mapping. Alternatively, the application framework 145 can be configured to update the entity mapping 135 following execution of a request to populate a program object in the program 125.

The system 100 reduces complexity in database applications, because implicit dynamic updating of the entity mapping 135 is avoided, and because the application framework 140 maintains the complete aggregate design. The program 125 keeps track of changes in the entity mapping 135, because updates are done explicitly. The application framework 140 makes updates to the entity mapping 135 by the program 125 feasible, at least because the application framework 140 strictly enforces complete aggregates representing 1-to-Many relationships between entities, as opposed to the conceptually more difficult Many-to-Many relationships.

The application framework 140 can receive the program 125 having one or more statements modifying a program object in the program 125 (represented as line connector 122). The one or more statements of the program 125 include an initial request to populate the program object with values for one or more attributes of a requested entity. It is understood that the statements of the program 125 can include a plurality of initial requests to populate a plurality of respective program objects, and that the techniques of the disclosed subject matter can be performed repeatedly for each initial request to populate the respective program object.

For example, the program 125 contains one or more statements, that when executed by the application framework 140, cause the application framework 140 to populate a book object with attributes corresponding to a book entity in a book table from the plurality of tables 190A-N. Additionally, the book entity is in a relationship with one or more author entities, representing the authors of the book, from an author table in the plurality of tables 190A-N.

The application framework 140 can query the relational database 185 via the relational database management system 180 to obtain values for one or more attributes of the requested entity and corresponding identifiers, e.g., foreign keys, for each entity associated with the requested entity (represented by line connector 124). If the query to the relational database 185 is for some, but not all data associated with the requested entity, then the application framework 140 can additionally query the relational database 185 for all the attributes for the requested entity, as well as a list of foreign keys for all the entities related to the requested entity. The query results of the query to the relational database 185 is used to generate a complete aggregate for the requested entity, as discussed below.

For example, the application framework 140 can query the relational database 185 for the title of a book entity, in response to a request to populate a book object in the program 125 with the title of the respective book entity. In addition, the application framework 140 can also query the relational database 185 for the other attributes of the book entity, e.g., the publication date of the book, as well as the list of foreign keys for entities related to the book entity, e.g., authors of the book. The application framework 140 can use the query results of the additional query to generate an aggregate for the book entity, as discussed below.

In response to the query, the relational database management system 180 can process the query through the relational database 185 and can return query results to the application framework 140 (represented by line connector 136). The query results returned can contain all of the attributes for an entity requested by the application framework 140, as well as a list of foreign keys for all the entities related to the requested entity.

The application framework 140 can generate an aggregate for the requested entity from the query results. In some implementations, the aggregate additionally has an aggregate ID and the identifiers for the entities related to the aggregate root are generated by a combination of: the aggregate ID, the foreign key for the respective entity, or both. The application framework 140 can enforce the requirement that the generated aggregate be a complete aggregate, because the query results returned from the relational database 185 includes all of the data associated with the requested entity.

The application framework 140 can populate the program object in the program 125 with the aggregate of the requested entity (represented by line connector 126). The application framework 140 can additionally load the cache 150 with data for the attributes of (i) the requested entity and (ii) the entities identified by identifier in the aggregate for the requested entity, depending on a loading strategy (represented by line connector 132). For example, one loading strategy for the application framework 140 is to load all attributes of the requested entity, and load data for all entities related to the requested entity by identifier in the cache 150.

Loading strategies can either be explicit, e.g., the program 125 includes statements to load data in the cache 150, or implicit, e.g., the application framework 140 follows a loading strategy to load data into the cache 150 automatically. A detailed explanation of loading strategies for the cache 150 is discussed below.

The application framework 140, after populating the object in the program 125 with the aggregate of the requested entity, can update the entity mapping 135 (represented as line connector 128). The application framework 140 can update the entity mapping 135 in response to a request to update the entity mapping 135 from the program 125. As discussed above, the request to update the entity mapping 135 can be a separate statement in the program 125, or the application framework 145 can be configured to additionally update the entity mapping 135 following a request from the program 125 to populate a program object. After the application framework 140 updates the entity mapping 135, the entity mapping reflects the relationship between the program object in the program 125 and the corresponding entity in the relational database 185.

In some implementations, the system maintains no dynamic connection between a program object and the database, except for static information that represents that class X is mapped to table tX, attribute X.a is mapped to column tX.ca, and so on. By severing the dynamic connection between database rows and program objects, the system solves the problems that make prior solutions hard to understand and computationally expensive.

After the application framework 140 executes the initial request to populate the program object to a respective entity in the relational database 185, the application framework 140 can receive subsequent requests to populate program objects in the program 125 and populate the program objects without querying the relational database 185 again.

In some implementations where the program 125 includes subsequent requests to further populate the program object, the application framework 140 can determine whether data satisfying the subsequent request has already been loaded in the cache 150. If data satisfying the subsequent request is already loaded into the cache 150, then the application framework 140 can update the program object in the program 125 with the pre-cached data (represented as line connector 134).

As described above, after updating the program object following a subsequent request by the program 125, the system does not automatically update the database. Rather, the program must request the updating explicitly. If the subsequent request is accompanied by a request to update the entity mapping 135, then the application framework 140 can also update the entity mapping 135 accordingly (represented by line connector 138).

The application framework 140 can enforce how the program 125 relates program objects to their respective entities. For example, because an aggregate for an entity includes a list of identifiers for each related entity, the application framework 140 can raise an exception if the program 125 requests to populate a program object with direct references to related entities not in the aggregate. By enforcing how the program 125 relates program objects to the respective entities, the application framework 140 can reduce the complexity of the entity mapping 135, at least because the application framework 140 enforces the aggregate design between program objects and respective entities to eliminate Many-to-Many and Many-to-1 relationships.

Figure 2:
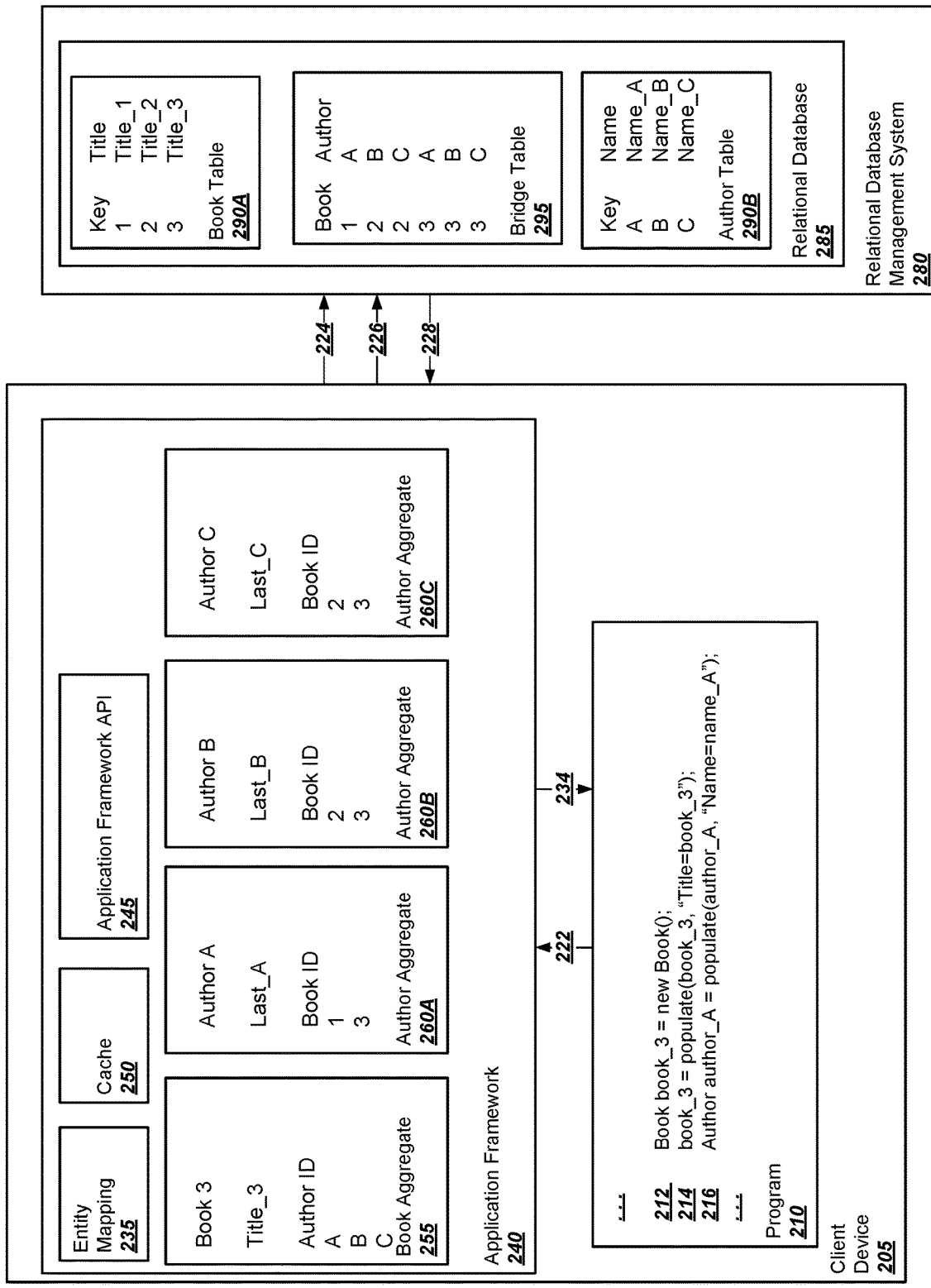
FIG. 2 is a diagram of a client device requesting and receiving data from a relational database.

FIG. 2 is a diagram of a client device 205 requesting and receiving data from a relational database 285. For exemplary purposes, the relational database 285 stores two tables, an author table 290A and a book table 290B. The entities in the tables 290A-B define a Many-to-Many relationship between book entities and author entities, which is represented with a bridge table 295 storing the relationships between book entities and author entities.

The client device 205 stores a program 210 and has installed an application framework 240. For clarity and ease of understanding, the source code for the program 210 is written at the level of a program intended to be executed by the application framework 240 that automatically provides some of the of the low-level functionality, including establishing a database connection to the relational database 285 through a relational database management system 280. Therefore, some functionality of the object relational mapping system are not represented by the statements in the source code examples, below.

The program 210 defines two types of program objects, book objects, and author objects. TABLE 1 illustrates an example class definition for a book object.

TABLE 1

| 1 | class Book(String title) { |
| 2 | List<Identifier<Author>> authors; |
| 3 | this.title = title; |
| 4 | } |

The book class definition includes a field for one book attribute: the title of the book, shown on line 3. Additionally, the class definition for a book object includes a list storing identifiers, e.g., foreign keys, for one or more author entities in the relational database 285, shown on line 2. In this example, a book object is always populated with a title, shown by the parameter "title" on line 1.

TABLE 2 illustrates an example class definition for an author object.

TABLE 2

| 1 | class Author(String name) { |
| 2 | List<Identifier<Book>> books; |
| 3 | this.name = name; |
| 4 | } |

The author class definition includes a field for one attribute for an author: the name of the author, shown on line 3. Additionally, the class definition for a book object includes a list storing identifiers for one or more book entities in the relational database 285, shown on line 2. In this example, an author object is always populated with a name, shown by the parameter "name" on line 1.

The program 210 contains statements 212-214, that, when executed by the application framework 240, cause the application framework 240 to populate a book object with attributes corresponding to a book entity in the book table 290A. The program 210 additionally contains a statement 216, that, when executed by the application framework 240, causes the application framework 240 to populate an author object with attributes corresponding to an author entity related to the book entity for the "book_3" object.

TABLE 3 illustrates an example of an initial request by the program 210 to populate a book object, and a request by the program 210 to populate an author object.

TABLE 3

| 212 | Book book_3 = new Book( ); |
| 213 | |
| 214 | Book_3 = populate(book 3, "Title = book_3"); |
| 215 | |
| 216 | Author author_A = populate(author_A, "Name = name_A"); |

Line 212 creates a new instance of a book object, called "book_3." Line 214 executes the populate operator, which takes as input a program object to populate, and a query for a requested entity. The application framework 240 can generate an aggregate for the requested entity to populate the "book_3" object. When the application framework 240 generates an aggregate, the application framework 240 can perform additional queries necessary to ensure that the application framework 240 generates a complete aggregate.

For example, line 214 executes the populate operator to populate the "book_3" object with the title of the "book_3" entity. However, to generate the aggregate for the "book_3" entity, the application framework augments the query, e.g., by sending additional queries, to the relational database 285 for all of the attributes of the requested entity, as well as all of the identifiers of entities related to the requested entity.

In some implementations, the populate operator also executes a request for the application framework 240 to update the entity mapping 235. Alternatively, the program 210 can include additional statements, e.g., "update( )", that when executed by the application framework 240, cause the application framework 240 to update the entity mapping 235 with the updated relationships between the program objects and the respective entities. A discussion of how the application framework 240 populates the "book_3" object in line 214 follows, below.

Lastly, line 216 creates a new author object, called "author_A" and populates the author object with an author entity with the name "name_A". Depending on the loading strategy used by the application framework 240, the application framework 240 can populate the "author_A" object without querying the relational database 285. For example, because the application framework 240 can enforce the generation of a complete aggregate for the "book_3" entity, e.g., as discussed above, then the application framework 240 can also generate author aggregates for the author entities related to the "book_3" entity, including the "author_A" entity, and load the author aggregates into the cache 250 before line 216 is executed by the application framework 240. As a result, the application framework 240 can avoid querying the relational database 285 at line 216, because the application framework 240 has already pre-loaded the "author_A" aggregate for populating the "author_A" program object.

If the aggregate for the "author_A" entity is not preloaded into the cache 250, then the application framework 240 can execute a query to populate the "author_A" object, similar to how the application framework 240 populated the "book_3" object, as discussed above. A discussion of how the application framework 240 executes line 216 follows, below.

The application framework 240 can receive the initial request to populate the book object (represented by line connector 222) and can execute the populate operator on line 214. In general, the populate operator is defined by an application framework API 245 to provide low level functionality for: establishing a database connection to the relational database 285, querying the tables 290A-B for tuples having a Title attribute with the value "book_3," and returning query results to the application framework 240.

In particular, the application framework 240 can execute the populate operator on line 214 and establish a database connection to the relational database 285 (represented by line connector 224). In some implementations, a database connection is persisted and so the application framework 240 is not required to explicitly establish a database connection.

The application framework 240 can query the tables 290A-B for entities having a Title attribute with the value "book_3" (represented by line connector 226). In this example, the book table 290B includes three tuples with elements of the format (Key, Title): (1, "Title_1"), (2, "Title_2"), and (3, "Title_3"). The relational database management system 280 can select the third tuple, (3, "Title_3"), and provide the tuple as part of the query results for the application framework 240.

However, as discussed above, the application framework 240 can query for all the attributes of a requested entity, as well as the list of identifiers of entities associated with the requested entity. Therefore, in addition to providing the queried tuple as part of the query results for the application framework 240, the relational database management system 280 additionally provides the list of identifiers associated with the requested entity.

For example, a book entity for "book_3" is associated with three author entities in the author table 290A. Specifically, a bridge table 295 stores the relationship of the "book_3" entity with three author entities. The author entities, represented by tuples having elements of the format (Key, Name), are: (A, "Name_A"), (B, "Name_B"), and (C, "Name_C"). The relational database management system 280 additionally includes the respective identifiers of the author entities associated with the "book_3" entity, in the query results, and sends the results to the application framework 240 (represented by line connector 228).

The application framework 240 can populate the book object initialized on line 214 in the program 210 with the title of the "book_3" entity and the list of identifiers for the author entities related to the "book_3" entity. The application framework 240 can update an entity mapping 235 to reflect the relationship between the book object populated on line 214 of the program 210 and the corresponding "book_3" entity (represented as line 232).

The application framework 240, from the query results, can additionally generate a book aggregate 255 for the "book_3" entity. The book aggregate 255 stores the attributes for the "book_3" entity, e.g., the title of the book, as well as the identifiers for the three author entities representing the authors of the "book_3". The book aggregate 255, once generated, represents all attributes for a respective entity, as well as identifies, e.g., by foreign key, all other entities having a relationship with the respective "book_3" entity.

Using the book aggregate 255, the application framework 240 can load a cache 250 with data for the attributes of (i) the "book_3" entity and (ii) the author entities related to the "book_3" entity. The loading strategy applied by the application framework 240 to load the cache 250 can vary from implementation to implementation, and is discussed in detail, below.

As an example, the application framework 240 can load the cache 250 with all the attributes of the "book_3" entity and all of the aggregates of the author entities related to the "book_3" entity. The application framework 240 can execute additional queries to the relational database 285, and can receive as query results the attributes of each author, e.g., the names of the authors, Name_A, Name_B, and Name_C, and the respective lists of identifiers for entities related to the author entities, e.g., entities representing books the authors have written. From the query results, the application framework 240 can then generate author aggregates 260A-C, for the respective author entities related to the "book_3" entity.

By pre-loading the cache 250 with data, the application framework 240 can handle subsequent requests to populate program objects in the program 210 by first checking the cache 250. For example, on line 216 of program 210, the program requests an author object called "author_A" be populated with an author having the name "name_A". The application framework 240 can check the cache 250 to see if an author aggregate for the "author_A" entity has been pre-loaded. For example, if the application framework 240 loaded the cache 250 with all the attributes of the "book_3" entity and all of the aggregates 260A-C of the author entities related to the "book_3" entity, as discussed above, then the cache 250 will be pre-loaded with the author aggregate 260A for the "author_A" entity.

The application framework 240 can then use the "author_A" author aggregate 260A to populate the "author_A" object in the program 210, without making an additional query to the relational database 285 (represented by line connector 234). The application framework 240 can update the entity mapping 235 to reflect the relationship between the new "author_A" author object in the program 210, with the "author_A" entity in the relational database 285.

Depending on the loading strategy employed, the application framework 240 can additionally pre-load the cache 250 with all of the attributes of the "author_A" entity, as well as the corresponding aggregates for the entities related to the "author_A" entity, e.g., an aggregate for the "book_1" entity and an aggregate for the "book_3" entity.

Figure 3:
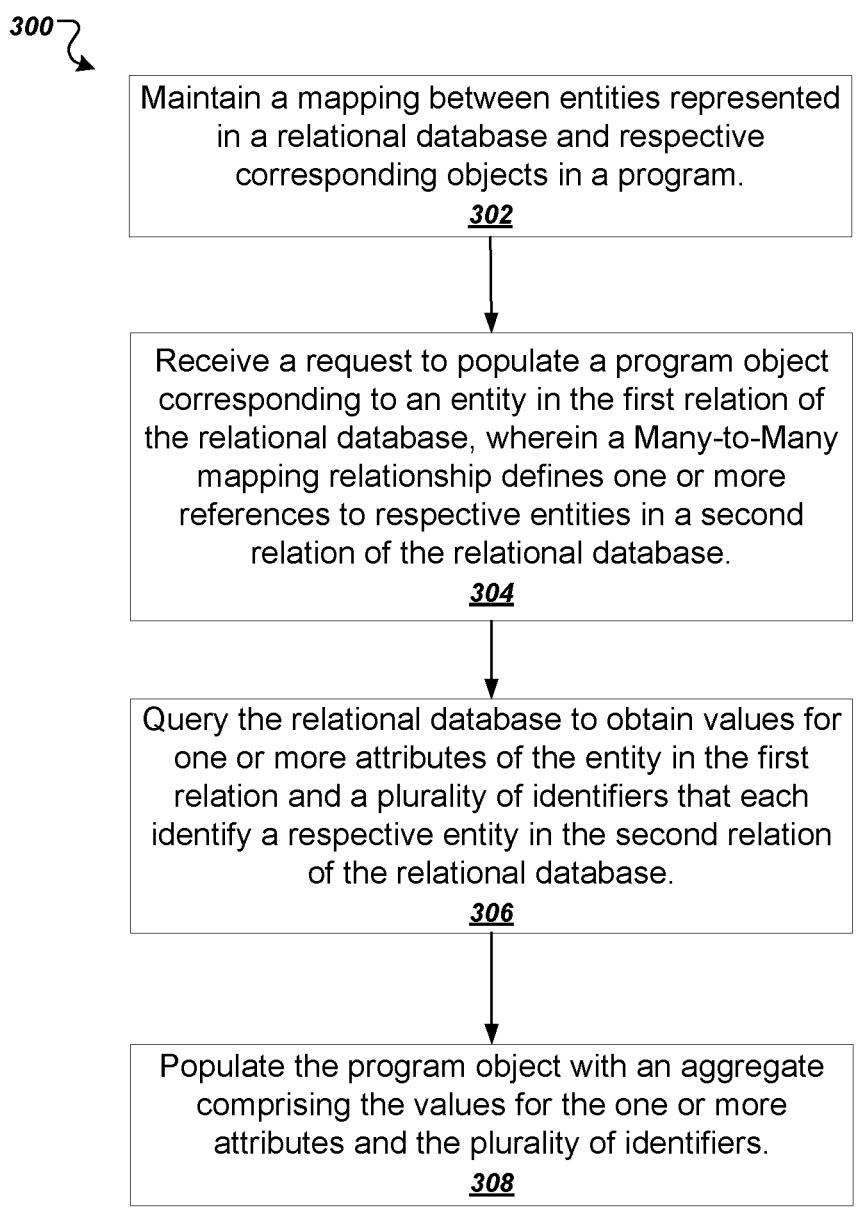
FIG. 3 is a flow chart of an example process for populating a program object in a program with an aggregate of a requested entity.

FIG. 3 is a flow chart of an example process 300 for populating a program object in a program with an aggregate of a requested entity. For convenience, the process 300 will be described as being performed by a system of one or more computers located in one or more locations. For example, a relational database object mapping system, e.g., the relational database object mapping system 100 of FIG. 1, appropriately programmed in accordance with this specification, can perform the process 300. Additional detail for implementing a system that can perform the process 300 can be found in the descriptions of FIG. 1 and FIG. 2, above.

The application framework maintains a mapping between entities represented in a relational database and respective corresponding objects in a program being executed by the application framework (302). As discussed above with reference to FIG. 1 and FIG. 2, the system can track manipulations in the program on program objects representing entities in the relational database and cause the application framework to perform corresponding updates to one or more tuples in the relational database, in response to explicit requests by the program to update the mapping. The application framework can use the entity mapping to track manipulations of program objects in the program.

The application framework receives a request to populate a program object corresponding to an entity in the first relation of the relational database, wherein a Many-to-Many mapping relationship defines one or more references to respective entities in a second relation of the relational database (304). As discussed above with reference to FIG. 1 and FIG. 2, the entity in the first relation can be a book entity in a first relation with a Many-to-Many relationship with author entities in a second relation.

The application framework queries the relational database to obtain values for one or more attributes of the entity in the first relation and a plurality of identifiers that each identify a respective entity in the second relation of the relational database (306). As discussed above with reference to FIG. 1 and FIG. 2, the application framework can query the relational database to obtain all of the attributes for the book entity in the first relation, as well as a list of all of the identifiers that each identify a respective author entity in the second relation.

The application framework populates the program object with an aggregate comprising the values for the one or more attributes and the plurality of identifiers (308). As discussed above with reference to FIG. 1 and FIG. 2, the application framework can populate the program object, e.g., a book object, with attributes of the corresponding book entity, as well as with the list of identifiers for the author entities related to the book entity.

As discussed above, after the application framework populates a program object with a corresponding entity in the relational database, the application framework can maintain the entity mapping for the program objects in the program executed by the application framework and the corresponding entities stored in the relational database.

For example, the application framework can receive an indication that the aggregate of a particular entity includes an additional relationship with another entity. The program can include an operator, that when executed by the application framework, inserts into the relational database a new author entity representing an additional author for a respective book entity. The application framework can receive an accompanying request to update the entity mapping and update the entity mapping accordingly. Alternatively, the application framework can be configured to update the entity mapping following a modification of a relationship between a program object and the respective entity for the program object.

Similarly, the application framework can receive an indication of the deletion of a relationship between the particular entity and another entity and can update the entity mapping accordingly.

The application framework can also handle requests from the program to insert a new aggregate into a program object comprising a plurality of identifiers. Specifically, the application can update the entity mapping to include the relationship between the program object and the plurality of identifiers.

As discussed above, implementations of the system can vary in the loading strategy the application framework uses in determining what to pre-load in the cache. For example, one loading strategy is for the application framework to load just the entity requested for populating a respective program object. The overall aim of the loading strategy applied by the application framework is to reduce the need for further database queries for subsequent requests to populate program objects in the program executed by the application framework.

In some implementations, the loading strategy for the application framework is to only load data explicitly indicated by the program executed by the application framework, e.g., by an explicit function to load data, as defined in the application framework API.

In some implementations, if the program explicitly indicates to the application framework that a particular entity be loaded into the cache, the application framework can additionally load all other entities of the same type as the particular entity into the cache. For example, if the program explicitly indicates to the application framework to load a book entity into the cache, then the application framework can additionally load all book entities in the relational database, into the cache. In other words, the application framework is configured not to perform lazy loading of the entities related to the particular entity.

In some implementations, the loading strategy is for the application framework to immediately generate and load an aggregate for any entity referenced by key and used to populate a program object. For example, as described above, if the application framework populates a book object with a list of foreign keys for author entities related to the respective book entity for the book object, then the application framework can generate additional author aggregates for each author entity referenced, and can load the cache with data from the author aggregates.

In some implementations, the loading strategy used is any strategy disclosed above, but limited by some condition. For example, the application framework can only load data into the cache, if the corresponding request to populate a program object occurs within a certain period of time, or within the same batch of requests made to the relational database.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nontransitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, subprograms, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a backend component, e.g., as a data server, or that includes a middleware component, e.g., an application server, or that includes a frontend component, e.g., a client computer having a graphical user interface, a web browser, or an app through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system comprising:
   one or more computers and one or more storage devices storing instructions that are operable, when executed by the one or more computers, to cause the one or more computers to perform operations comprising:
   maintaining, by an application framework, a mapping between entities represented in a relational database and respective corresponding objects in a program being executed by the application framework, wherein manipulations in the program on program objects representing entities in the relational database causes the application framework to perform corresponding updates to one or more tuples in the relational database,
   wherein the relational database includes a plurality of relations defining an m-to-n mapping relationship between entities in a first relation of the relational database and respective entities in a second relation of the relational database, and
   wherein the application framework enforces that program objects representing entities in the first relation are represented as aggregates having a complete set of identifiers of related entities in the second relation;
   receiving, by the application framework, a request to populate a first attribute of a first program object, wherein the first program object corresponds to a first entity in the first relation of the relational database, wherein the m-to-n mapping relationship in the relational database defines one or more references from the first entity to respective related entities in the second relation of the relational database;
   in response to receiving the request to populate the first attribute of the first program object corresponding to the first entity, augmenting a query to request a value of the first attribute from the first relation and a complete set of identifiers of related entities to the first entity from a different relation of the relational database;
   querying, by the application framework using the augmented query, the relational database to obtain the value of the first attribute of the first entity from the first relation and the complete set of identifiers that correspondingly identify the related entities to the first entity from the different relation of the relational database; and
   populating, by the application framework, the first program object with an aggregate, the aggregate comprising the obtained value of the first attribute of the first entity from the first relation and the complete set of identifiers obtained from the different relation.

2. The system of claim 1, wherein the operations further comprise:
   receiving, by the application framework, an indication that the aggregate was updated by the program with information identifying a new entity in the second relation; and
   in response, updating the m-to-n mapping relationship of the relational database with an identifier of the new entity in the second relation in response to the aggregate being updated by the program.

3. The system of claim 2, wherein updating the m-to-n mapping relationship comprises:
   deleting, from the m-to-n mapping relationship, all identifiers to which the first entity in the first relation is mapped; and inserting, into the m-to-n mapping relationship, all identifiers identifying all entities in the second relation belonging to the aggregate.

4. The system of claim 1, wherein the operations further comprise:
receiving, by the application framework, a request to save a new aggregate for an entity in the first relation comprising a plurality of identifiers for entities in the second relation; and
in response, inserting, into the m-to-n mapping relationship, all identifiers for the entities in the second relation belonging to the new aggregate.

5. The system of claim 1, wherein the application framework is configured not to perform lazy loading of references to the identifiers for entities in the second relation.

6. The system of claim 1, wherein the application framework is configured to always load all identifiers for entities in the second relation when populating program objects corresponding to entities in the first relation.

7. The system of claim 1, wherein generating an aggregate comprises:
generating the aggregate to have only attributes of the first entity in the first relation or identifiers of aggregate roots of different aggregates.

8. The system of claim 1, wherein the different relation is a bridge table representing relationships between entities in the first relation and the second relation.

9. The system of claim 1, wherein the different relation is the second relation.

10. The system of claim 1, further comprising:
transparently generating aggregates for each of the related entities, each aggregate for each related entity having a complete set of identifiers of correspondingly related entities from the first relation.

11. The system of claim 1, wherein the application framework does not allow aggregate entities to reference entities in other aggregates.

12. A method comprising:
maintaining, by an application framework, a mapping between entities represented in a relational database and respective corresponding objects in a program being executed by the application framework, wherein manipulations in the program on program objects representing entities in the relational database causes the application framework to perform corresponding updates to one or more tuples in the relational database,
wherein the relational database includes one or more a plurality of relations defining an m-to-n mapping relationship between entities in a first relation of the relational database and respective entities in a second relation of the relational database, and
wherein the application framework enforces that program objects representing entities in the first relation are represented as aggregates having a complete set of identifiers of related entities in the second relation;
receiving, by the application framework, a request to populate a first attribute of a first program object, wherein the first program object corresponds corresponding to a first entity in the first relation of the relational database, wherein the m-to-n mapping relationship in the relational database defines one or more references from the first entity to respective related entities in the second relation of the relational database;
in response to receiving the request to populate the first attribute of the first program object corresponding to the first entity, augmenting a query to request a value of the first attribute from the first relation and a complete set of identifiers of related entities to the first entity from a different relation of the relational database;
querying, by the application framework using the augmented query, the relational database to obtain the value of the first attribute values for one or more attributes of the first entity from the first relation and the complete set of identifiers that correspondingly identify the related entities to the first respective entity from the different relation of the relational database; and
populating, by the application framework, the first program object with an aggregate, the aggregate comprising the obtained value of the first attribute of the first entity from the first relation and the complete set of identifiers obtained from the different relation.

13. The method of claim 12, further comprising:
receiving, by the application framework, an indication that the aggregate was updated by the program with information identifying a new entity in the second relation; and
in response, updating the m-to-n mapping relationship of the relational database with an identifier of the new entity in the second relation in response to the aggregate being updated by the program.

14. The method of claim 13, further comprising:
deleting, from the m-to-n mapping relationship, all identifiers to which the first entity in the first relation is mapped; and
inserting, into the m-to-n mapping relationship, all identifiers identifying all entities in the second relation belonging to the aggregate.

15. The method of claim 12, further comprising:
receiving, by the application framework, a request to save a new aggregate for an entity in the first relation comprising a plurality of identifiers for entities in the second relation; and
in response, inserting, into the m-to-n mapping relationship, all identifiers for the entities in the second relation belonging to the new aggregate.

16. The method of claim 12, wherein the application framework is configured not to perform lazy loading of references to the identifiers for entities in the second relation.

17. The method of claim 12, wherein the application framework is configured to always load all identifiers for entities in the second relation when populating program objects corresponding to entities in the first relation.

18. The method of claim 12, wherein generating an aggregate comprises:
generating the aggregate to have only attributes of the first entity in the first relation or identifiers of aggregate roots of different aggregates.

19. One or more non-transitory computer storage media, comprising instructions what when executed by one or more computers cause the one or more computers to perform operations comprising:
maintaining, by an application framework, a mapping between entities represented in a relational database and respective corresponding objects in a program being executed by the application framework, wherein manipulations in the program on program objects representing entities in the relational database causes the application framework to perform corresponding updates to one or more tuples in the relational database,
wherein the relational database includes one or more a plurality of relations defining an m-to-n mapping relationship between entities in a first relation of the relational database and respective entities in a second relation of the relational database, and wherein the application framework enforces that program objects representing entities in the first relation are represented as aggregates having a complete set of identifiers of related entities in the second relation;

receiving, by the application framework, a request to populate a first attribute of a first program object, wherein the first program object corresponds corresponding to a first entity in the first relation of the relational database, wherein the m-to-n mapping relationship in the relational database defines one or more references from the first entity to respective related entities in the second relation of the relational database;

in response to receiving the request to populate the first attribute of the first program object corresponding to the first entity, augmenting a query to request a value of the first attribute from the first relation and a complete set of identifiers of related entities to the first entity from a different relation of the relational database;

querying, by the application framework using the augmented query, the relational database to obtain the value of the first attribute values for one or more attributes of the first entity from the first relation and the complete set of identifiers that correspondingly identify the related entities to the first respective entity from the different relation of the relational database; and populating, by the application framework, the first program object with an aggregate, the aggregate comprising the obtained value of the first attribute of the first entity from the first relation and the complete set of identifiers obtained from the different relation.

20. The computer storage media of claim 19, the operations further comprising:

receiving, by the application framework, an indication that the aggregate was updated by the program with information identifying a new entity in the second relation; and in response, updating the m-to-n mapping relationship of the relational database with an identifier of the new entity in the second relation in response to the aggregate being updated by the program.

21. The computer storage media of claim 19, the operations further comprising:

generating the aggregate to have only attributes of the first entity in the first relation or identifiers of aggregate roots of different aggregates.

* * * * *